(No Model.)
2 Sheets—Sheet 2.
T. R. TIMBY.
Coast Defense.
No. 240,786.                    Patented April 26, 1881.
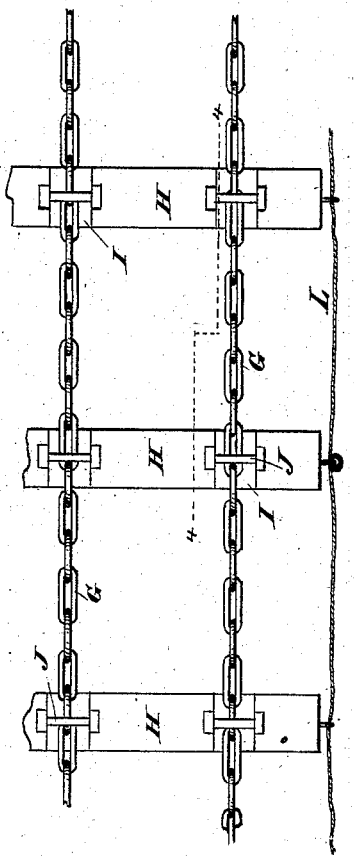
Fig 3.
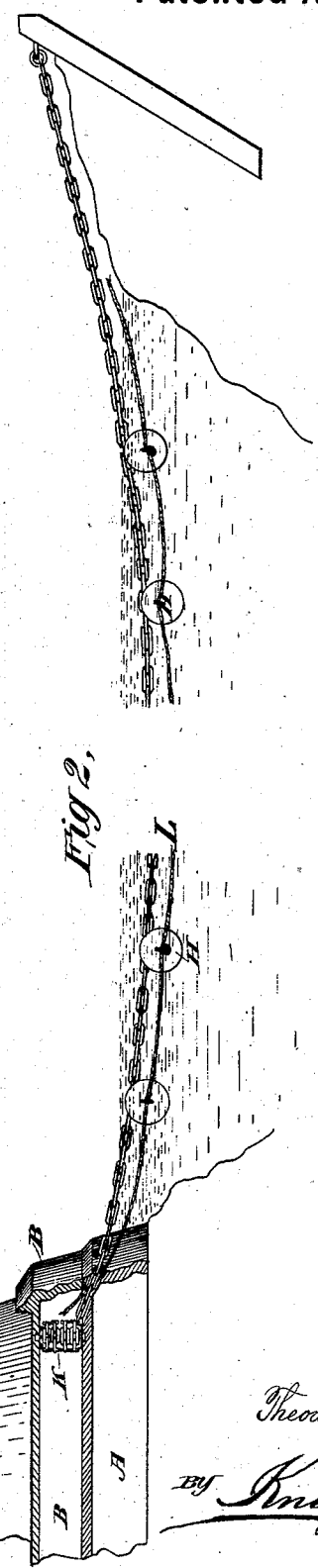
Fig 2.
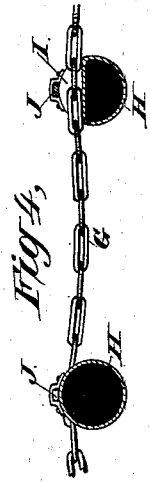
Fig 4.
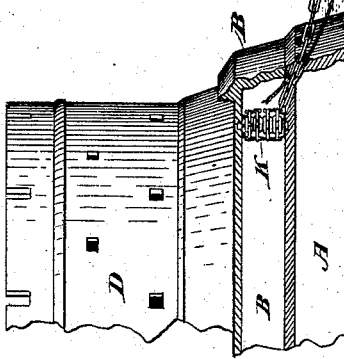
Attest
Geo. T. Smallwood Jr.
Harry E. Knight
Inventor:
Theodore R. Timby
By Knight Bros
attys

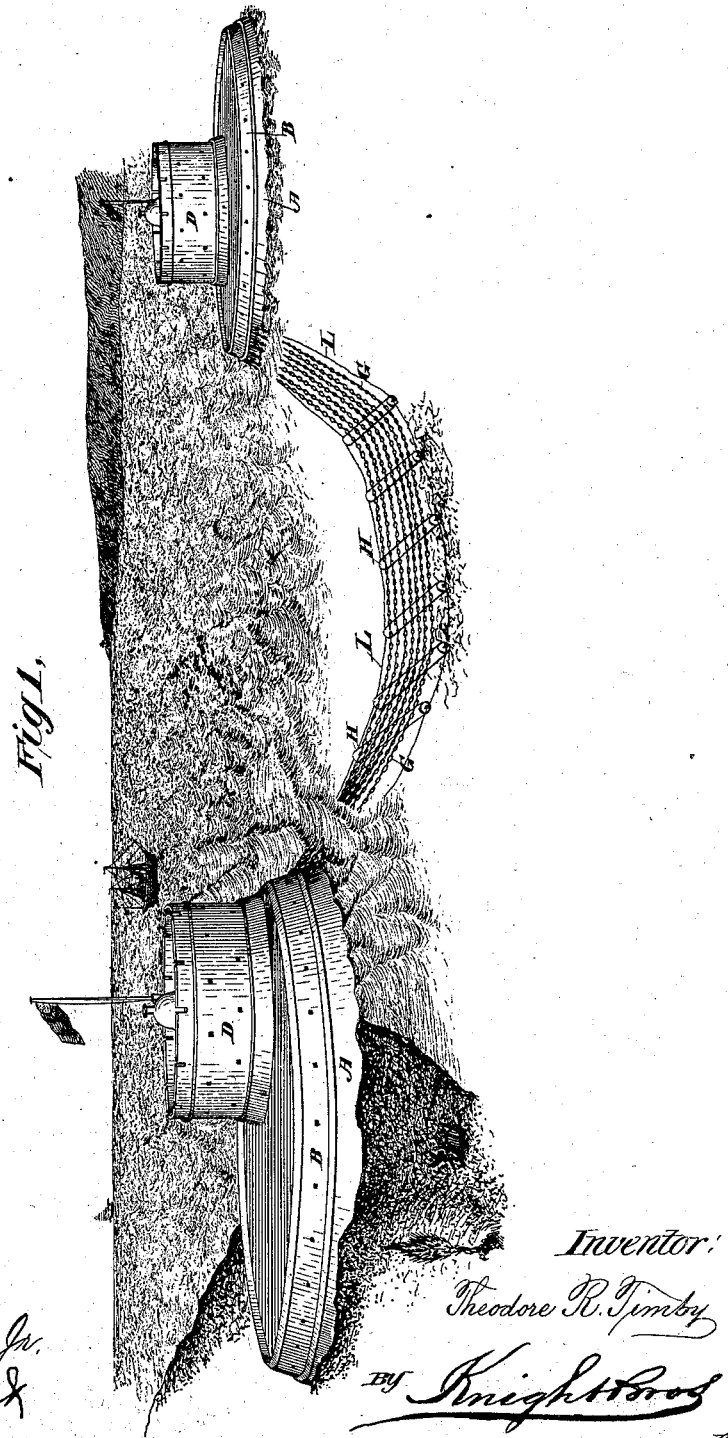

UNITED STATES PATENT OFFICE.

THEODORE R. TIMBY, OF NYACK, NEW YORK.

COAST-DEFENSE.

SPECIFICATION forming part of Letters Patent No. 240,786, dated April 26, 1881.

Application filed February 9, 1881. (No model.)

*To all whom it may concern:*

Be it known that I, THEODORE R. TIMBY, of Nyack, in the county of Rockland and State of New York, have invented certain Improvements in Coast-Defenses, of which the following is a specification.

The object of my invention is to provide means for obstructing a channel, so that hostile ships attempting to enter a harbor or approach a city may be detained, and at the same time may be subjected to a destructive fire from one or more suitably arranged and appointed forts. To this end I employ a series of chains extended between two forts arranged on opposite sides of the channel, or between a fort and a suitable moorage or attachment for the remote ends of the chains.

The invention further consists in combining a series of chains extended across a channel, and connected by buoys, which have the combined effects of assisting to sustain the chains in the required position near the surface of the water and cause them to mutually support each other against a horizontal strain.
In order that the invention may be fully understood, I will proceed to describe it with reference to the accompanying drawings, in which—

Figure 1 is a perspective view of two forts located on opposite sides of a channel, with a series of connected chains extended across the channel between them. Fig. 2 is an elevation, showing the chains elevated in their effective position. Fig. 3 is a plan of a portion of the chains and connecting-buoys on a large scale. Fig. 4 is a section on the two planes indicated by the broken line 4 4, Fig. 3.

On each side of the channel is a suitable foundation, A, for a revolving bed or base, B, on which is mounted a rotating tower, D, capable of independent rotation, and adapted to be adjusted radially on the said bed or base, so that by the rotation of the said bed or base the tower may be moved around a center other than its own, so as to be carried bodily out of range of guns which may have been trained upon it, as I have described in another application for Letters Patent.

G G represent any desirable number of parallel chains extended across a channel between two towers, D D; or, if preferred, said chains may be used with a single tower containing the apparatus for drawing them up into effective position, their remote ends being permanently attached or anchored in any efficient manner. Any desirable number of buoys, H H, are placed across the chains, so as to connect them and partially support their weight in the water. By their buoyant effect they render it quite easy to draw and support the chains as near to the surface of the water as may be desirable, and all the chains being by their means securely connected, the said chains are caused to mutually support each other against a horizontal strain, so that any stress brought on one of them by an approaching vessel will be borne by all combined, and the pressure against the first of the chains will cause the whole series to tilt up in an inclined position, so as to afford an insurmountable barrier to the passage of the ship. The buoys may be made hollow, of metal, or solid, of any buoyant material, and are provided with recesses I I, for the reception of the chains G, and keys J J, for retaining the chains therein. The buoys may thus be readily slipped on the chains to the desired positions or put on and off as required.

Capstans are shown at K K for winding up the chains. These may be operated simultaneously, or other adequate means may be used for the purpose. Similar capstans may be used for drawing the buoys along the chains by lanyards L. By means of the buoys the chains may be supported as near the surface of the water as required without being drawn taut. They are thus in the most effective position to destroy the momentum of a vessel with the least strain to themselves.

I am aware that various modes have before been devised for obstructing channels by means of chains with and without torpedoes. My invention differs from others within my knowledge, in that I employ a set or series of parallel chains, each extending from side to side of the channel, connected by buoys in such a manner that the said chains are caused to mutually support and strengthen each other, and when the first of the series is pressed against, the whole will be tipped into an oblique position, so as to constitute an insurmountable barrier.

Having thus described my invention, the following is what I claim as new therein and desire to secure by Letters Patent:

1. The combination of one or more revolving towers or turrets and one or more chains adapted to be drawn up across a channel, to obstruct the passage of vessels, as explained.

2. The chains G, in combination with buoys H, movable or adjustable thereon, substantially as and for the purposes set forth.

3. The combination of a series of chains drawn across a channel and a buoy or buoys secured to said chains, so as to partially sustain their weight in the water and cause them to mutually support each other against a horizontal strain.

THEODORE R. TIMBY.

Witnesses:
  OCTAVIUS KNIGHT,
  HARRY E. KNIGHT.